(12) United States Patent
Ahn et al.

(10) Patent No.: US 11,268,751 B2
(45) Date of Patent: Mar. 8, 2022

(54) REFRIGERATOR AND METHOD FOR CONTROLLING THE SAME

(71) Applicant: LG ELECTRONICS INC., Seoul (KR)

(72) Inventors: Seunguk Ahn, Seoul (KR); Sunam Chae, Seoul (KR); Kyunghun Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 16/571,603

(22) Filed: Sep. 16, 2019

(65) Prior Publication Data

US 2020/0088462 A1 Mar. 19, 2020

(30) Foreign Application Priority Data

Sep. 14, 2018 (KR) .................. 10-2018-0110040

(51) Int. Cl.
*F25D 29/00* (2006.01)
*F25D 11/02* (2006.01)
(Continued)

(52) U.S. Cl.
CPC .......... *F25D 29/003* (2013.01); *F25B 49/022* (2013.01); *F25D 11/022* (2013.01); *F25D 17/065* (2013.01); *F25D 17/067* (2013.01); *F25D 2317/0671* (2013.01); *F25D 2317/0682* (2013.01); *F25D 2700/121* (2013.01)

(58) Field of Classification Search
CPC .... F25D 29/003; F25D 11/022; F25D 17/065; F25D 17/067; F25D 2700/121; F25D 2317/0682; F25D 2317/0671; F25D 2700/122; F25D 2700/12; F25D 29/00; F25D 2600/06; F25B 49/022; F25B 2600/01; F25B 2600/0251; F25B 2600/112; F25B 2600/2507; F25B 2700/2104; F25B 2400/19; F25B 2500/31; F25B 2500/19;
(Continued)

(56) References Cited

U.S. PATENT DOCUMENTS

| 8,640,471 | B2 * | 2/2014 | Lee ........................ F25D 29/00 62/89 |
| 9,080,805 | B2 * | 7/2015 | Yanagida ................ F25D 29/00 |

FOREIGN PATENT DOCUMENTS

KR 10-1576686 12/2015

OTHER PUBLICATIONS

ACHR News Network, "Quick Facts: Migration And Pump Down Systems" (Year: 2005).*

* cited by examiner

*Primary Examiner* — Marc E Norman
(74) *Attorney, Agent, or Firm* — Ked & Associates, LLP

(57) ABSTRACT

The method for controlling the refrigerator includes operating a first cooling cycle for cooling the first storage compartment to operate the compressor and operating a first fan for the first storage compartment, and switching the first cooling cycle to a second cooling cycle for cooling the second storage compartment to operate the compressor and operating a second fan when a stop condition of the first cooling cycle is satisfied. A temperature of each storage compartment is sensed at sampling time intervals in each cooling cycle. Further, a cooling power of the compressor is determined for each sampling time based on a sensed current temperature of the storage compartment, and the compressor is operated at the determined cooling power.

19 Claims, 11 Drawing Sheets

(51) Int. Cl.
*F25D 17/06* (2006.01)
*F25B 49/02* (2006.01)
(58) Field of Classification Search
CPC . F25B 49/02; F25B 5/02; F25B 41/26; Y02B 30/70
See application file for complete search history.

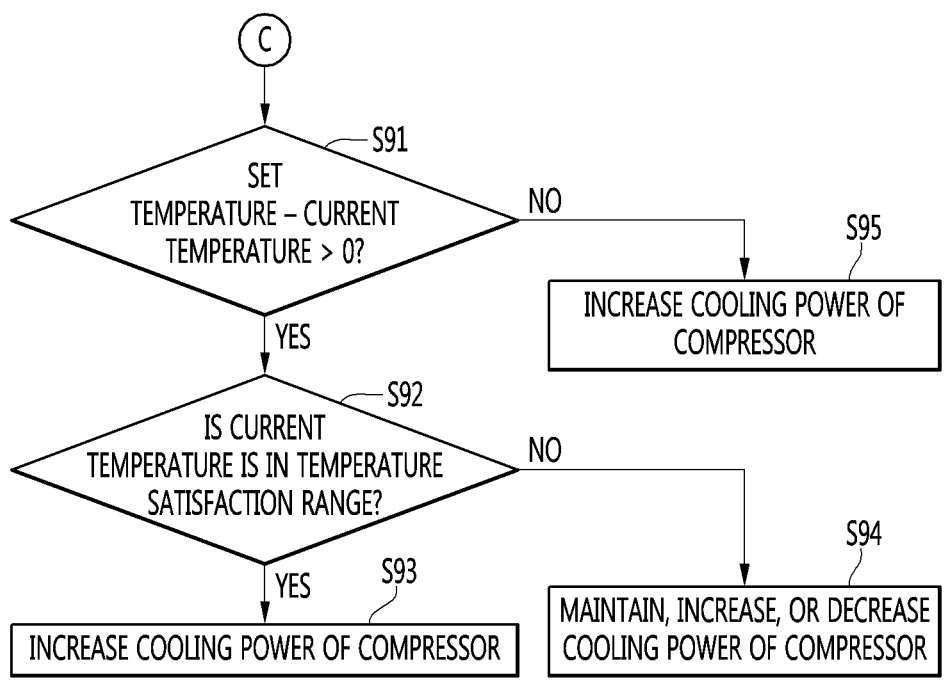

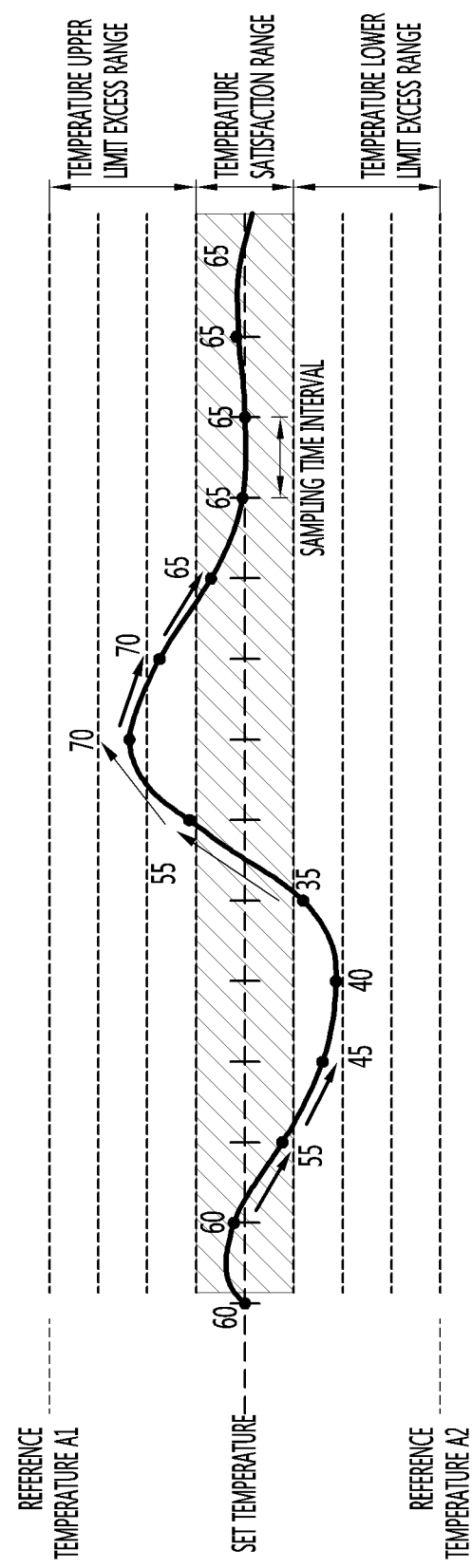

REFRIGERATOR AND METHOD FOR CONTROLLING THE SAME

CROSS-REFERENCE TO RELATED APPLICATION

This application claims priority under 35 U.S.C. § 119 to Korean Application No. 10-2018-0110040 filed on Sep. 14, 2018, whose entire disclosure is hereby incorporated by reference.

BACKGROUND

1. Field

The present disclosure relates to a refrigerator and a control method therefor.

2. Background

Refrigerators are appliances that provide a storage compartment that is cooled to be maintained in a low temperature range. For example, a refrigerator may selectively activate a refrigeration cycle to maintain the storage compartment in a temperature range having an upper limit and a lower limit that are determined based on a set temperature. For example, the refrigerator may activate the refrigeration cycle to cool the storage compartment when a temperature of the storage compartment exceeds the upper limit, and may stop the refrigeration cycle when the temperature of the storage compartment reaches the lower limit.

A refrigerator may include two or more storage compartments that are maintained in different temperature ranges. For example, refrigerator may include a freezer compartment that is maintained below a freezing point of water, and a refrigerating compartment that is maintained above the freezing point of water. The refrigerator may include multiple evaporators, such as a first evaporator to cool the freezing compartment and a second evaporator to cool the refrigerating compartment. The refrigerator may allow a refrigerant to flow between the evaporators of the freezing compartment and the refrigerating compartment.

Korean Patent Registration No. 10-1576686 (dated Dec. 4, 2015) describes a control method in which after a refrigerating compartment valve and a refrigerating compartment fan operate to cool the refrigerating compartment, a freezing compartment valve and a freezing compartment fan operate to cool the freezing compartment. After the cooling of the freezing compartment is completed, the compressor is stopped and the freezing compartment fan may continue to rotate to reduce a temperature of the freezing compartment due to latent heat of evaporation. However, although the temperature of the freezing compartment may continue to decrease even when the compressor is stopped, the refrigerating compartment is not being cooled. Consequently, this control method may cause the refrigerating compartment to have a greater variation in temperature such that the freshness of the foods in the refrigerating compartment cannot be maintained.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIGS. 7 to 10 are flowcharts for illustrating a method for adjusting a cooling power of a compressor according to a third embodiment.

FIG. 11 is a graph for illustrating a change in a temperature of a storage compartment and a cooling power control of a compressor according to a third embodiment.

DETAILED DESCRIPTION

Figure 1:
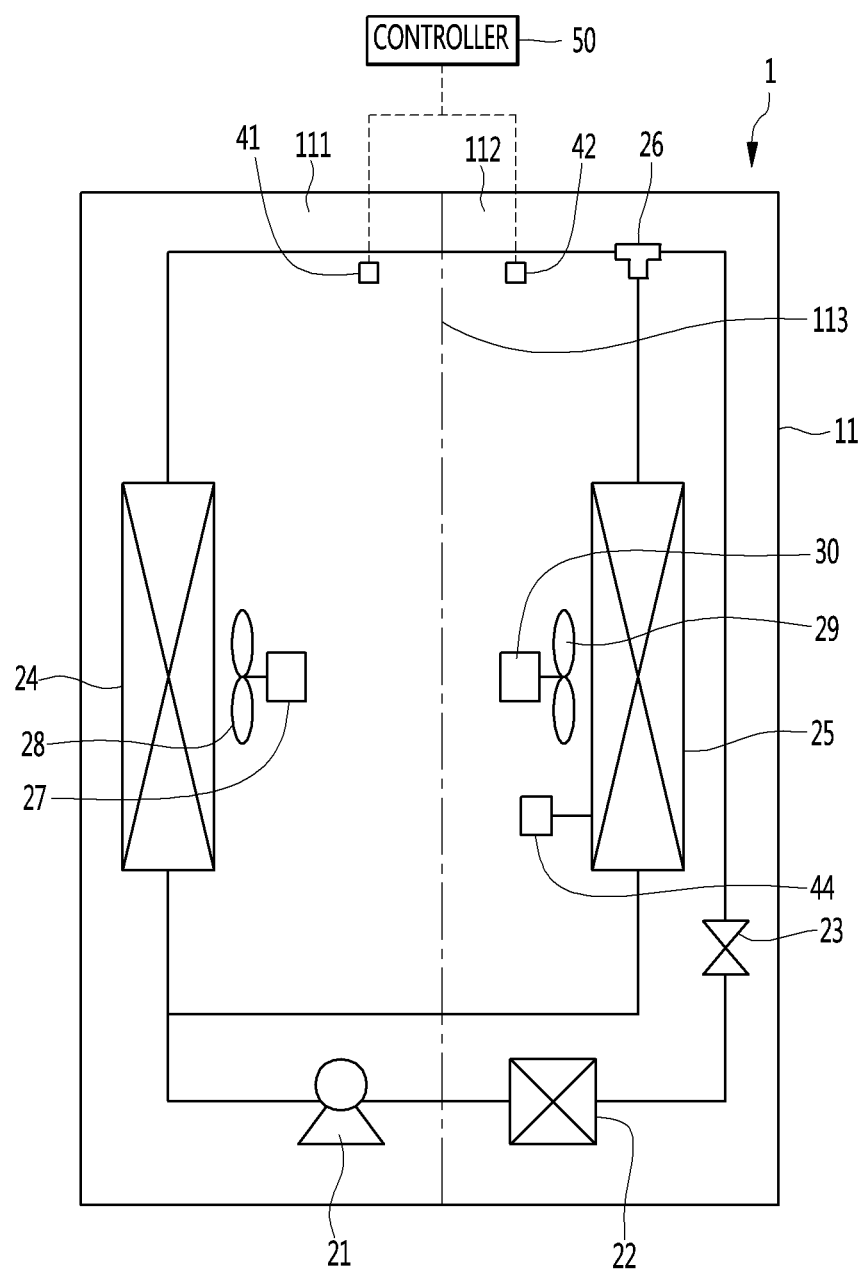
FIG. 1 is a schematic view illustrating a configuration of a refrigerator according to the present invention.

Hereinafter, embodiments of the present disclosure will be described in detail with reference to the accompanying drawings. It is noted that the same or similar components in the drawings are designated by the same reference numerals as far as possible even if they are shown in different drawings. In the following description of the present disclosure, a detailed description of certain known functions and configurations incorporated herein may be omitted for brevity and to improve the clarity of the subject matter of the present disclosure.

Figure 2:
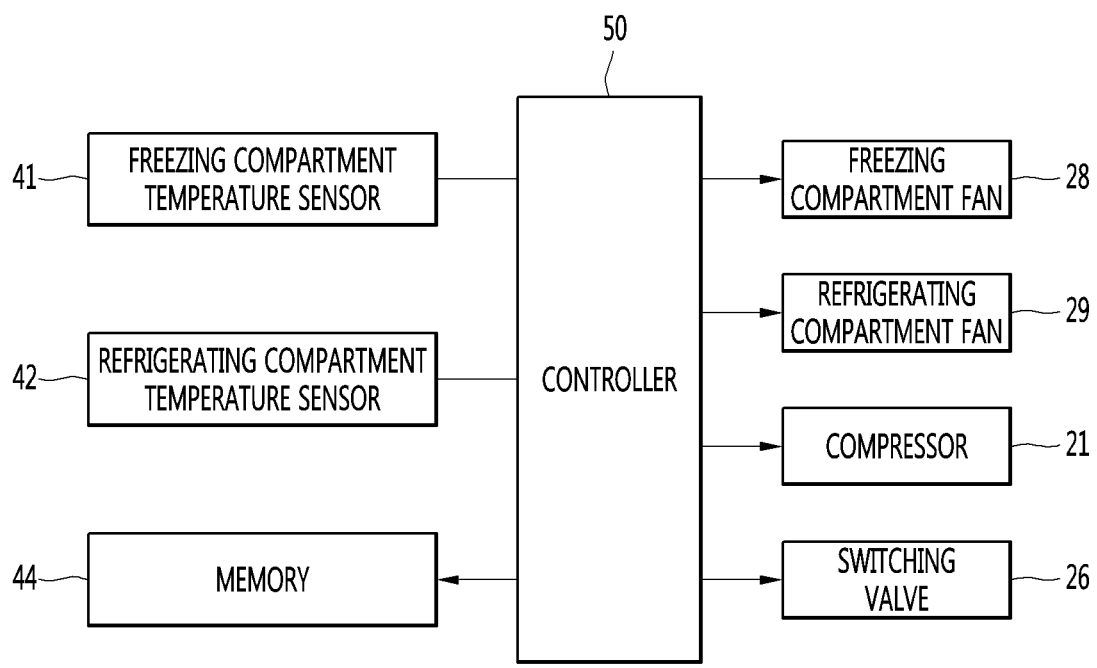
FIG. 2 is a block diagram of the refrigerator according to the present invention.

Referring to FIGS. 1 and 2, a refrigerator 1 according to an embodiment of the present disclosure may include a cabinet 10 having a first compartment (also referred to as a freezer compartment) 111, a second compartment (also referred to as a refrigerating compartment) 112, and one or more doors (not shown) coupled to the cabinet 10 to open and close the freezing compartment 111 and the refrigerating compartment 112. The freezing compartment 111 and the refrigerating compartment 112 may be horizontally or vertically separated within the cabinet 10 by a partition wall 113 (shown in FIG. 1 as extending vertically such that the freezing compartment 111 and the refrigerating compartment 112 oriented horizontally).

The refrigerator 1 may further include components of a refrigeration cycle, such as a compressor 21, a condenser 22, an expansion member (or expansion valve) 23, a first evaporator 24 to generate cold air for cooling the freezing compartment 111, and a second evaporator (or "second evaporator") 25 to generate cold air for cooling the refrigerating compartment 112. For example, the first evaporator 24 may generate cold air for cooling the freezing compartment 111, and the second evaporator 25 may generate cold air for cooling the refrigerating compartment 112. The refrigerator 1 may include a switching valve 26 that directs refrigerant that has passed through the expansion member 23 to one of the first evaporator 24 or the second evaporator 25.

In one embodiment, the switching valve 26 may operate in a first state in which the switching valve 26 directs the refrigerant to flow to the first evaporator 24 (e.g., to cool the freezing compartment). Also, the switching valve 26 may operate in a second state in which the switching valve 26 directs the refrigerant to flow to the second evaporator 25 (e.g., to cool the refrigerating compartment). The switching valve 26 may be, for example, a three way valve (e.g., a valve that operates in one of the first state, the second state, or a third (or closed) state in which the refrigerant does not flow to either the first evaporator 24 or the second evaporator 25).

The switching valve 26 may selectively open one of a first refrigerant passage connected between the compressor 21 and the second evaporator 25 to allow the refrigerant to flow therebetween and a second refrigerant passage connected between the compressor 21 and the first evaporator 24 to allow the refrigerant to flow therebetween. The cooling of the refrigerating compartment 112 and cooling of the freezing compartment 111 may occur alternately, as managed by the switching valve 26.

The refrigerator 1 may include a freezing compartment fan 28 (also referred to as a "first cooling fan") for blowing air to the first evaporator 24, a first fan motor 27 for rotating the freezing compartment fan 28, a refrigerating compartment fan 29 (also referred to as a "second cooling fan") for blowing air to the second evaporator 25, and a second fan motor 30 for rotating the refrigerating compartment fan 29.

In one embodiment, a series of processes in which the refrigerant flows between the compressor 21, the condenser 22, the expansion member 23, and the first evaporator 24 may be referred to as a "freezing cycle" related to cooling the freezing compartment 111. Similarly, a series of processes in which the refrigerant flows between the compressor 21, the condenser 22, the expansion member 23, and the second evaporator 25 may be referred to as a "refrigerating cycle" to cool the refrigerating compartment 112.

In the present description, operating or activating the refrigerating cycle may generally indicate that the compressor 21 is turned on, the refrigerating compartment fan 29 is turned on to generate an air flow, and the switching valve 26 directs refrigerant to flow to the second evaporator 25 such a heat exchange occurs between the refrigerant in the second evaporator 25 and air from the refrigerating compartment fan 29 to cool the refrigerating compartment 112.

Further, operating or activating the freezing cycle may indicate that the compressor 21 is turned on, the freezing compartment fan 28 is activated to generate an air flow, and the switching valve 26 directs refrigerant to flow to the first evaporator 24 such that a heat exchange occurs between the refrigerant flowing in the first evaporator 24 and air from the freezing compartment fan 28 to cool the freezing compartment 111.

Although one expansion member 23 may be positioned upstream of the switching valve 26, as described above, another implementation may include a first expansion member 23 that is positioned between the switching valve 26 and the first evaporator 24, and a second expansion member 23 positioned between the switching valve 26 and the second evaporator 25 for the refrigerating compartment.

In another implementation (not shown), the switching valve 26 may be omitted or otherwise not used to regulate a flow of refrigerant to one of the first evaporator 24 or the second evaporator 25. For example, a first valve (not shown) may be provided at an inlet side of the first evaporator 24, and a second valve (not shown) may be provided at an inlet side of the second evaporator 25 for the refrigerating compartment. In this other implementation, while the freezing cycle operates, the first valve may be turned while the second valve is turned off such that refrigerant flows only to the first evaporator 24. Similarly, when the refrigerating cycle operates, the first valve may be turned off while the second valve is turned on such that refrigerant flows only to the second evaporator 25.

As previously described, the freezing compartment 111 may also be referred to as a first storage compartment 111, and the refrigerating compartment 112 may also be referred to as a second storage compartment 112. Accordingly, the freezing cycle may also be referred to as a first cooling cycle for the first storage compartment, and the refrigeration cycle may be referred to as a second cooling cycle for the second storage compartment. It should be appreciated that the control principles described herein may also be used, for example, in an appliance 1 having two separate freezer compartments (e.g., both first storage compartment 111 and second storage compartment 112 are maintained in a range of temperatures below the freezing point of water by first and second cooling cycles) or having two separate refrigerating compartments (e.g., both first storage compartment 111 and second storage compartment 112 are maintained in a range of temperatures above the freezing point of water by first and second cooling cycles).

The refrigerator 1 may further include a freezing compartment temperature sensor (or first temperature sensor) 41 to determine a temperature associated with the freezing compartment 111, and a refrigerating compartment temperature sensor (or second temperature sensor) 42 to determine a temperature associated with the refrigerating compartment 112. The refrigerator 1 may further include an input unit (or input device) 43 to receive a user input, such as an input identify respective target temperatures (or a set temperatures) for the freezing compartment 111 and the refrigerating compartment 112. In one example, the refrigerator 1 of the present embodiment may further include a memory 44 in which temperatures of the freezing compartment 111 and the refrigerating compartment 112 are stored.

Thus, a user may set a target temperature of each of the freezing compartment 111 and the refrigerating compartment 112. In another example, one or more of the target temperatures may be preset (e.g., stored in the memory 44), received via communications with another device, or may be determined by the controller 50 based on various factors, such as an ambient external temperature, a location of the refrigerator 1, an attribute of an item stored in the refrigerator 1, etc. The refrigerator 1 may further include a control unit (also referred to as control circuitry or a controller) 50 to manage the cooling cycle (including the freezing cycle and the refrigerating cycle) based on a target temperature and the temperatures sensed by the temperature sensors 41 and 42.

In the following discussion, a temperature lower than the set or target temperature of the refrigerating compartment 112 may be referred to as a first or lower refrigerating compartment reference temperature (or a first reference temperature) and a temperature higher than the set temperature of the refrigerating compartment 112 may be referred to as a second or upper refrigerating compartment reference temperature (or a second reference temperature). In addition, a range between the first refrigerating compartment reference temperature and the second refrigerating compartment reference temperature may be referred to as a set temperature range for the refrigerating compartment (or a refrigerating temperature range). In one example, the set temperature of the refrigerating compartment 112 may correspond to a mean temperature of the first refrigerating compartment reference temperature and the second refrigerating compartment reference temperature.

Similarly, a temperature less than that set temperature of the freezing compartment 111 may be referred to as a first or lower freezing compartment reference temperature (or a third reference temperature), and a temperature greater than the set temperature of the freezing compartment 111 may be called a second or upper freezing compartment reference temperature (or a fourth reference temperature). A range between the first freezing compartment reference temperature and the second freezing compartment reference temperature may be called a freezing compartment set temperature range (or a freezing temperature range). In one example, the set temperature of the freezing compartment 111 may correspond to a mean temperature of the first freezing compartment reference temperature and the second freezing compartment reference temperature.

In one embodiment, the controller 50 may control the refrigerating cycle, the freezing cycle, and a pump down operation to form one operation cycle. For example, the controller 50 may start the operating cycle while continuously operating the compressor 21 (e.g., without stopping the compressor 21). In the present discussion, the pump down operation may generally refer to an operation that includes collecting the refrigerant remaining in each of the evaporators 24, 25 into the compressor 21 by operating the compressor 21 while a supply of the refrigerant to the evaporators 24 and 25 is blocked (e.g., the switching valve 26 is in the third mode).

In one example, the controller 50 may operate the refrigerating cycle to cool the refrigerating storage chamber 112. Further, when a stop condition of the refrigerating cycle is satisfied, the controller 50 may stop the refrigerating cycle and operate the freezing cycle to cool the freezing storage chamber 111. When a stop condition of the freezing cycle is satisfied while the freezing cycle is operating, the controller 50 may stop the freezing cycle and perform the pump down operation to collect the refrigerant remaining in each of the evaporators 24, 25 into the compressor 21. When the pump down operation is completed, the refrigerating cycle may be operated again.

In the present discussion, the stop condition of the refrigerating cycle may occur when the cooling of the refrigerating compartment is completed. Similarly, the stop condition of the freezing cycle may occur when the cooling of the freezing compartment is completed. Furthermore, the stop condition of the refrigerating cycle may correspond to a start condition of the freezing cycle. For example, the stop condition of the refrigerating cycle may be triggered when a start condition for the freezing cycle occurs, such as determining that freezing compartment 111 is above an upper threshold temperature.

In some implementations, the pump down operation may be selectively omitted. For example, the controller 50 may operate the refrigerating cycle and the freezing cycle alternately. In this example, the refrigerating cycle and the freezing cycle may combine to form one operation cycle without the pump down operation. In one example, when a temperature of outside air is low (e.g., below an ambient threshold temperature), the pump down operation may be omitted.

Figure 3:
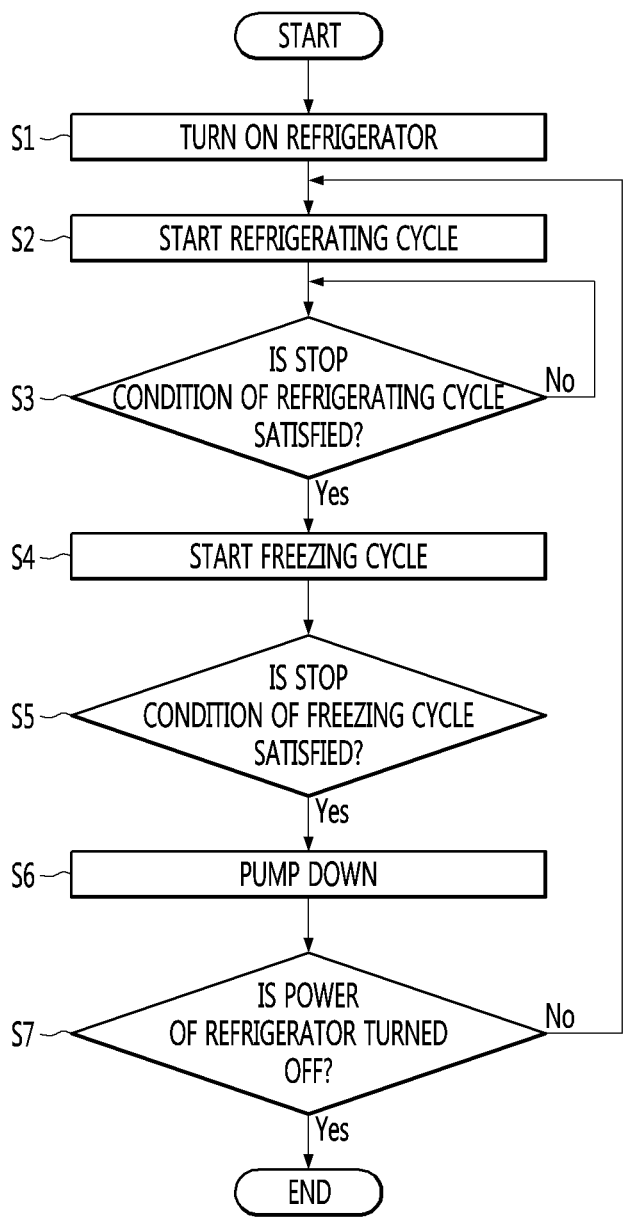
FIG. 3 is a flowchart for schematically illustrating a basic method for controlling a refrigerator according to the present invention.

Hereinafter, a basic method for controlling the refrigerator of the present embodiment will be described. FIG. 3 is a flowchart for schematically illustrating a basic method for controlling a refrigerator according to an embodiment of the present invention. Referring to FIG. 3, power of the refrigerator 1 is turned on (S1). When the power of the refrigerator 1 is turned on, the refrigerator 1 for cooling the freezing compartment 111 or the refrigerating compartment 112 operates.

Hereinafter, a basic method for controlling the refrigerator 1 when the refrigerating compartment 112 is first cooled and then the freezing compartment 111 is cooled will be described. In order to cool the refrigerating compartment 112, the controller 50 starts operating the refrigerating cycle (S2). In one example of operating the refrigerating cycle, the controller 50 may turn on the compressor 21 and activate the refrigerating compartment fan 29. The controller 50 then switches the switching valve 26 into a first state such that the refrigerant flows to the second evaporator 25. In one implementation, the freezing compartment fan 28 may be maintained in a stationary state (e.g., is inactive) when the refrigerating cycle is in operation.

Then, the refrigerant, which has been compressed by the compressor 21 and then passed through the condenser 22, flows through the switching valve 26 and into the second evaporator 25. The refrigerant evaporated while flowing through the second evaporator 25 flows back into the compressor 21. Air is cooled through a heat-exchange with the second evaporator 25 and is supplied to the refrigerating compartment 112. Thus, the temperature of the refrigerating compartment 112 may be lowered while the temperature of the freezing compartment 111 is increased.

The controller 50 may adjust the cooling power (or output) (also referred to herein as a cooling level) of the compressor 21 while the refrigerating cycle is in operation. The adjustment of the cooling power of the compressor 50 will be described below.

The controller 50 determines whether the stop condition of the refrigerating cycle is satisfied while the refrigerating cycle is in operation (S3). For example, the controller 50 may determine that the stop condition of the refrigerating cycle is satisfied when the start condition of the freezing cycle is satisfied. The determining of whether the stop condition of the refrigerating cycle is satisfied will be described below.

When it is determined that the stop condition of the refrigerating cycle is satisfied (S3—Yes), the controller 50 stops the refrigerating cycle and starts operating the freezing cycle (S4). Otherwise, when the stop condition of the refrigerating cycle is not satisfied (S3—No), the controller 50 continues operating the refrigerating cycle in S2. In one example of operating the freezing cycle in S4, the controller 50 switches the switching valve 26 into a second state such that refrigerant may flow to the first evaporator 24. Even when the refrigerating cycle is stopped and the freezing cycle is operated, the compressor 21 may continue to operate without stopping.

Continuing with the operating of the freezing cycle in S4, the controller 50 activates the freezing compartment fan 28 and stops the refrigerating compartment fan 29. In one implementation, in order to delay a temperature rise of the refrigerating compartment 112, the refrigerating compartment fan 29 may be stopped a prescribed time delay after operation of the freezing cycle is started.

The controller 50 may adjust the cooling power (or output) of the compressor 21 while the refrigerating cycle is in operation. The adjustment of the cooling power of the compressor 21 will be described below.

The controller 50 may determine whether the stop condition of the freezing cycle is satisfied during the operation of the freezing cycle (S5). The method for determining whether the stop condition of the refrigerating cycle is satisfied will be described below.

When the freezing cycle is stopped, the pump down operation may be performed (S6). In one implementation, when the freezing cycle is stopped, in order to delay a temperature rise of the freezing compartment 111, the freezing compartment fan 28 may be started a prescribed length of time after the pump down operation is started.

As long as the power of the refrigerator 1 is not turned off (S7—No), the controller 50 returns to S2 and starts the refrigerating cycle again. Otherwise, if the power of the refrigerator 1 is turned off (S7—Yes), the process in FIG. 3 ends.

Figure 4:
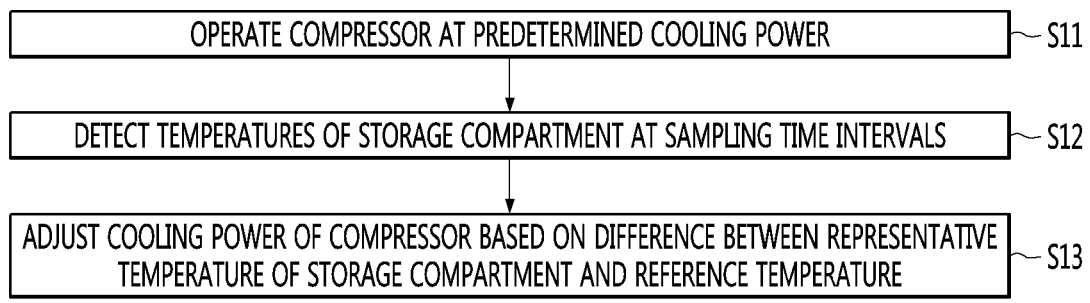
FIG. 4 is a flowchart for illustrating a method for adjusting a cooling power of a compressor in a cooling cycle according to a first embodiment of the present invention.
Figure 5:
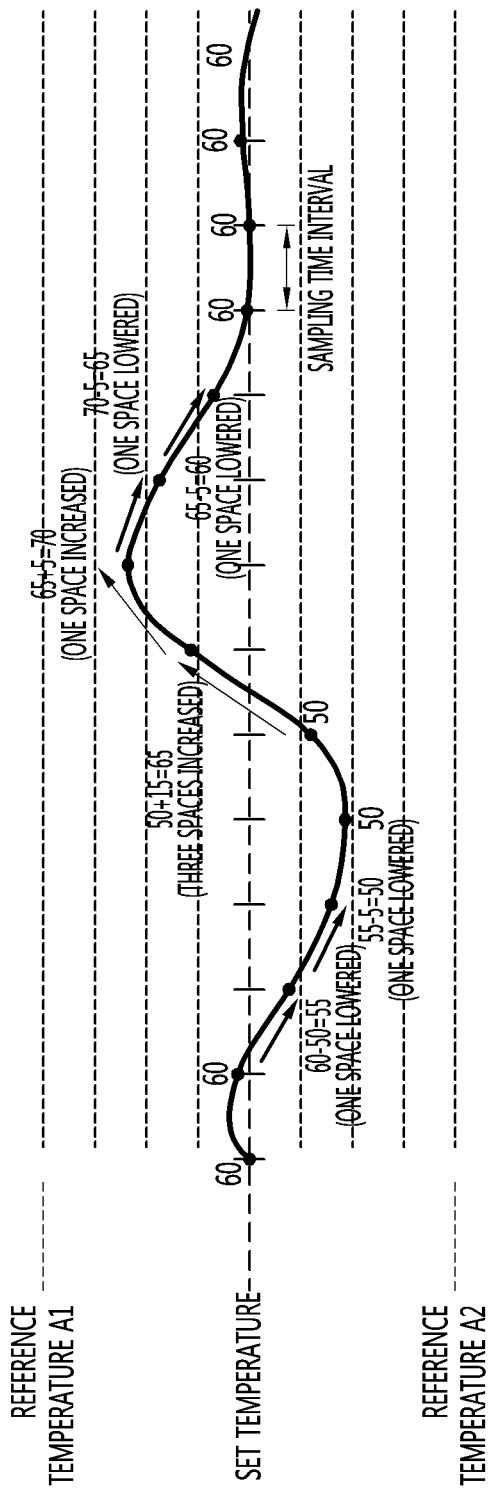
FIG. 5 is a graph for illustrating a change in a temperature of a storage compartment and a cooling power control of a compressor according to a first embodiment of the present invention.

FIG. 4 is a flowchart for illustrating a method for adjusting a cooling power or cooling level of a compressor in a cooling cycle according to a first embodiment, and FIG. 5 is a graph for illustrating a change in a temperature of a storage compartment and a cooling power control of a compressor according to the first embodiment. Hereinafter, a method for controlling the cooling power of the compressor based on a temperature of the storage compartment in the cooling cycle will be described. The method for adjusting the cooling power of the compressor 4 may be similarly applied to the refrigerating cycle and the freezing cycle.

Referring to FIGS. 4 and 5, when the cooling cycle is started, the compressor 21 operates at a predetermined cooling power (S11). The predetermined cooling power may be an intermediate cooling power between minimum and maximum cooling power of the compressor 21.

A temperature of the storage compartment may be sensed at sampling time intervals (S12). For example, the temperature may be sensed at certain intervals (e.g., every minute) and/or based on a triggering factor, such as an opening of a door or drawer to the refrigerator. Further, the controller 50 may adjust the cooling power of the compressor 21 based on a difference between a representative temperature of the storage compartment and a reference temperature (S13).

The representative temperature of the storage compartment may be a current temperature of the storage compartment, and the reference temperature may be a previously sensed temperature of the storage compartment. In another example, the representative temperature of the storage compartment may be determined based on multiple temperatures, such as an average of temperatures detected in different regions of a storage compartment or of a current temperature and one or more previously detected temperatures. In another example, the reference temperature may be determined based on two or more previously sensed temperatures of the storage compartment, such as an average of temperatures detected at two different prior times.

For example, when the compressor 21 is operating with cooling power of 60 (e.g., 60 percent of a maximum cooling power of the compressor), the cooling power may be maintained (e.g., the compressor continues to operate at the cooling power of 60), decreased (e.g., the compressor is operated at a reduced cooling power, such as 55 or 50) or increased (e.g., the compressor is operated at an increased cooling power, such as a cooling power of 65 or 70), according to the temperature of the storage compartment.

For example, when an absolute value of the difference between the previous temperature and the current temperature is less than a first reference value, the controller 50 may maintain the cooling power of the compressor 21. Alternatively, when an absolute value of the difference between the previous temperature and the current temperature is equal to or greater than the first reference value, the controller 50 may increase or decrease the cooling power of the compressor 21.

For example, when the difference between the previous temperature and the current temperature is greater than 0 (e.g., the temperature is increasing over a recent time period) and the absolute value of the difference between the previous temperature and the current temperature is equal to or greater than the first reference value, the cooling power of the compressor 21 may be decreased by a first level. Alternatively, when the difference between the previous temperature and the current temperature is less than 0 (e.g., the temperature is increasing during a recent time period) and the absolute value of the difference between the previous temperature and the current temperature is equal to or greater than the first reference value, the cooling power of the compressor 21 may be increased by the first level.

In one embodiment, a plurality of reference values for comparison with the absolute value of the difference between the previous temperature and the current temperature may be set. For example, when the difference between the previous temperature and the current temperature is greater than 0 and the absolute value of the difference between the previous temperature and the current temperature is equal to or greater than a second reference value greater than the first reference value, the cooling power of the compressor 21 may be decreased by a second level. In addition, when the absolute value of the difference between the previous temperature and the current temperature is equal to or greater than a third reference value greater than the second reference value, the cooling power of the compressor 21 may be decreased by a third level.

Alternatively, when the difference between the previous temperature and the current temperature is less than 0 and the absolute value of the difference between the previous temperature and the current temperature is equal to or greater than the second reference value greater than the first reference value, the cooling power of the compressor 21 may be increased by the second level. In addition, when the absolute value of the difference between the previous temperature and the current temperature is equal to or greater than the third reference value greater than the second reference value, the cooling power of the compressor 21 may be increased by the third level.

The reference values may differ may a set amount. For example, the reference values may differ by 0.5, such as the first reference value being set to 0.5, the second reference value being set to 1, and the third reference value being set to 1.5. In another example, the reference values may differ by 0.4 such that when the first reference value is set to 0.5, the second reference value may be set to 0.9, and the third reference value may be set to 1.3.

In addition, the differences between the plurality of levels may vary by similar or different amounts. For example, when the first level may be set to a value "A" as a cooling power change value, the second level may be set to 2*A as a cooling power change value, and the third level may be set to 3*A as a cooling power change value. Alternatively, when the first level may be set to a value A as a cooling power change value, the second level may be set to a value B that is greater than A and is not equal to 2*A as a cooling power change value, and the third level may be set to a value C that is greater than B and does not equal 3*A as a cooling power change value.

When the cooling power of the compressor 21 is decreased in S13 (for example, the cooling power is 55), the process in FIG. 4 may return to S12 and the current temperature of the storage compartment may be sensed after the sampling time. When the difference between the previous temperature and the current temperature is greater than 0 and the absolute value of the difference between the previous temperature and the current temperature is equal to or greater than the first reference value, the cooling power of the compressor 21 may be decreased again (for example, the cooling power may be set 50) is S13.

When the cooling power of the compressor 21 is increased in S13 (for example, the cooling power is 65), the process in FIG. 4 may return to S12 and the current temperature is sensed after the sampling time. When the difference between the previous temperature and the current temperature is less than 0 and the absolute value of the difference between the previous temperature and the current temperature is equal to or greater than the first reference value, the cooling power of the compressor 21 may be increased again (for example, the cooling power is 70) in S13.

As the temperature of the storage compartment is sensed at the sampling time interval and the cooling power of the compressor 21 is controlled, the temperature of the storage compartment converges to the set temperature as long as there are no external influences. Since the temperature of the storage compartment converges to the set temperature, a variation in temperature of the storage compartment is reduced.

In one embodiment, the stop condition of the cooling cycle (the stop condition of the cooling cycle and the stop condition of the freezing cycle) being satisfied may correspond to the cooling power of the compressor 21 being maintained within a predetermined range for a predetermined time (e.g., 10 or more minutes). For example, as shown in FIG. 5, when the cooling power of the compressor 21 remains unchanged for a predetermined time, it may be determined that the stop condition of the cooling cycle is satisfied.

For example, when the cooling power of the compressor 21 is maintained within the predetermined range for the predetermined time while the refrigerating cycle is in operation, since there is little change in the temperature of the refrigerating compartment 112, the refrigerating cycle may be stopped and the freezing cycle may be started, and vice versa. For example, when the variation in the temperature of the storage compartment is maintained within the predetermined range for the predetermined time, the controller 50 may determine that the stop condition of the cooling cycle is satisfied.

In other examples, when the current temperature of the storage compartment reaches the set temperature, the controller 50 may determine that the stop condition of the cooling cycle is satisfied. In another example, when the current temperature of the storage compartment reaches the set temperature and a predetermined time elapses, the controller 50 may determine that the stop condition of the cooling cycle is satisfied. In another example, when the cooling cycle is started and a set time has elapsed, the controller 50 may determine that the stop condition of the cooling cycle is satisfied.

Figure 6:
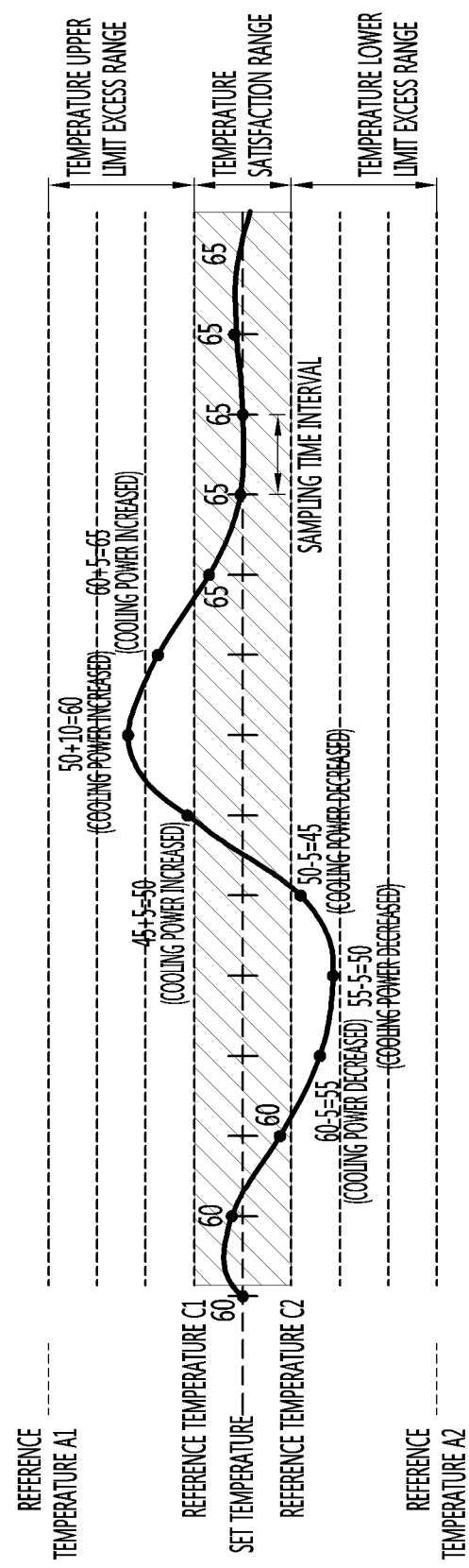
FIG. 6 is a graph for illustrating a change in a temperature of a storage compartment and a cooling power control of a compressor according to a second embodiment.
Figure 7:
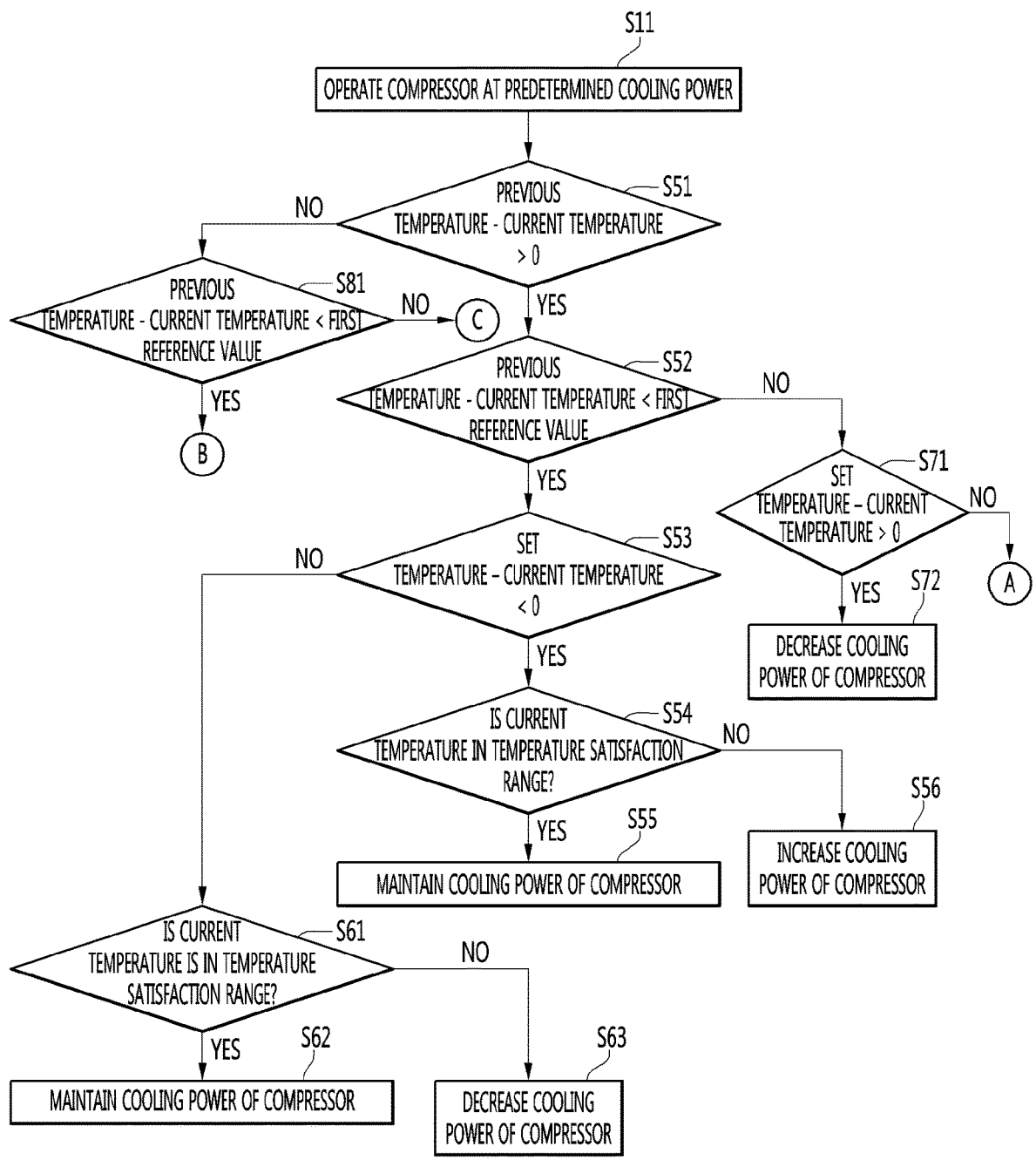
Figure 8:
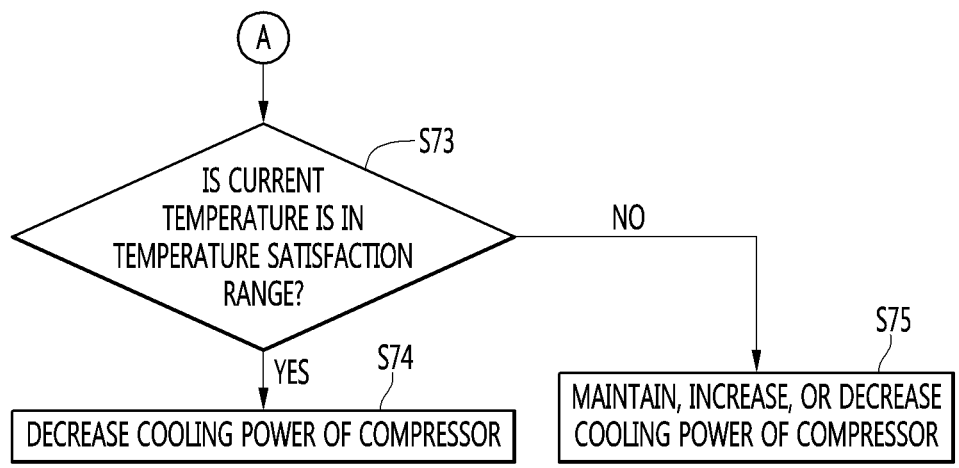
Figure 9:
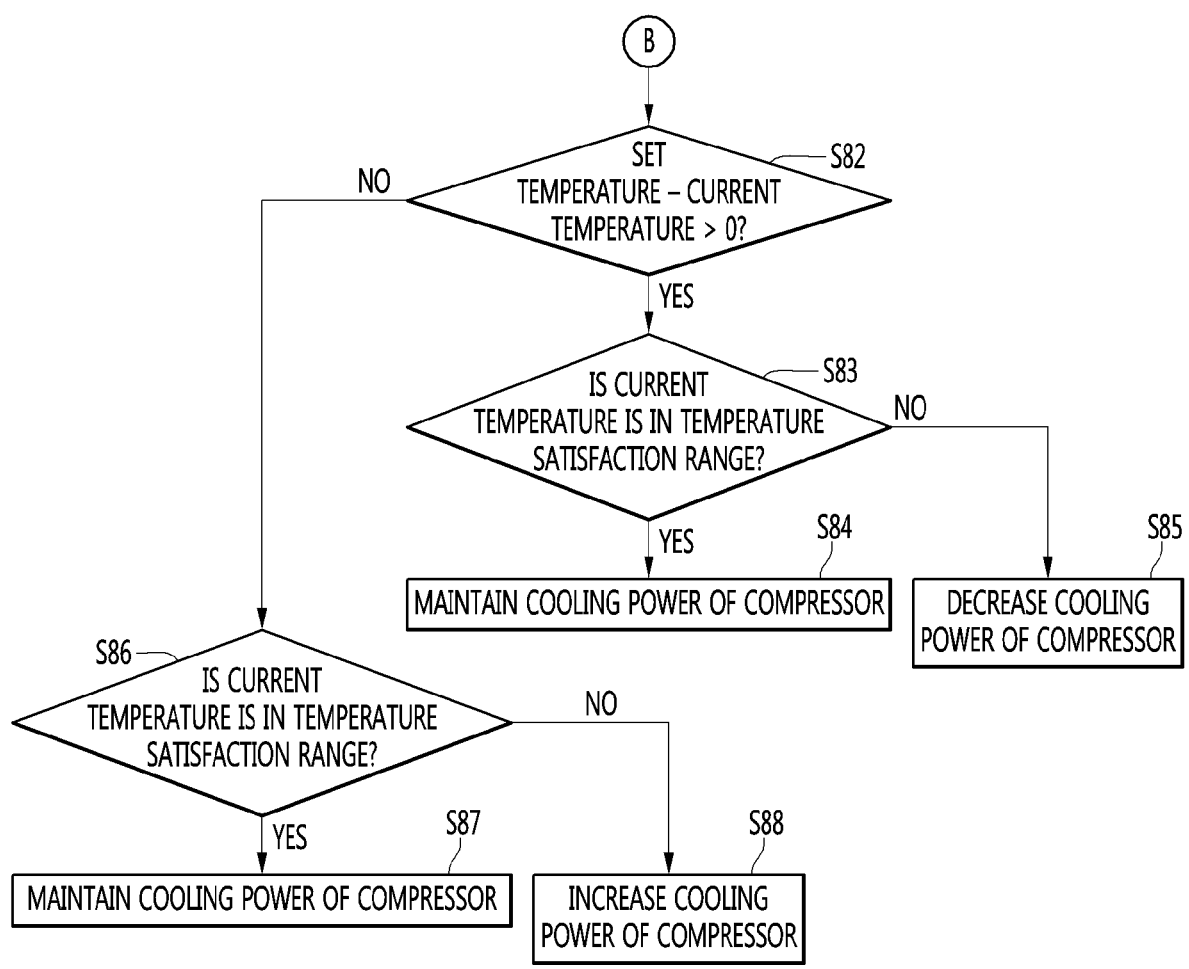

FIG. 6 is a graph for illustrating a change in a temperature of a storage compartment and a cooling power control of a compressor according to a second example. The example shown in FIG. 6 is similar to the example depicted in FIG. 5, except that there is a difference in a method for controlling the cooling power of the compressor. Therefore, hereinafter, only characteristic parts and differences associated with example in FIG. 6 will be described.

In this example of FIG. 6, a representative temperature of the storage compartment is a current temperature of the storage compartment and the reference temperature may be a set temperature of the storage compartment. The controller 50 may adjust the cooling power of the compressor 21 using a difference value between the set temperature and the current temperature of the storage compartment.

At this time, the controller 50 may sense the current temperature of the storage compartment at the predetermined time interval and control the cooling power of the compressor 21 based on whether the absolute value of the difference between the set temperature and the current temperature is less than a first upper limit reference value or a first lower limit reference value. For example, a temperature higher than the set temperature by the first upper limit reference value may be referred to as a temperature upper limit (reference temperature C1) and a temperature lower than the set temperature by the first lower limit reference value may be referred to as a temperature lower limit (reference temperature C2).

The first upper limit reference value and the first lower limit reference value may be equal or different. For example, the first upper limit reference value and the first lower limit reference value may be set to a similar value (e.g., 0.5) or the first upper limit reference value may be greater or less than the first lower limit reference value.

When the absolute value of the difference between the set temperature and the current temperature of the storage compartment is less than the first lower limit reference value or the first upper limit reference value, the current temperature may be lower than the temperature upper limit and higher than the temperature lower limit. When the current temperature of the storage compartment is lower than the temperature upper limit and higher than the temperature lower limit, the current temperature of the storage compartment will be described as being located in the temperature satisfaction range.

In addition, when the current temperature of the storage compartment is higher than the temperature upper limit, the current temperature of the storage compartment will be described as being located in the temperature upper limit excess range and, when the current temperature of the storage compartment is lower than the temperature lower limit, the current temperature will be described as being located in the temperature lower limit excess range. In this example, the temperature upper limit may be a temperature value lower than a reference temperature A1 (the second reference temperature and the fourth reference temperature) and higher than the set temperature, and the temperature lower limit may be a temperature value higher than a reference temperature A2 (the first reference temperature and the third reference temperature) and lower than the set temperature.

The controller 50 senses the current temperature of the storage compartment at the predetermined time interval. Accordingly, the predetermined time may correspond to a sampling time for determining change in temperature. The sampling time may be constant or changed according to the current temperature. For example, if the current temperature is located in the temperature satisfaction range, a first sampling time is applicable as a sampling time for sensing a current temperature of a next time. In contrast, if the current temperature is located outside the temperature satisfaction range, a second sampling time greater or less than the first sampling time is applicable as a sampling time for sensing a current temperature of a next time.

For example, while the compressor 21 operates with cooling power of 60, the cooling power may be maintained (e.g., the compressor 21 continues to operate at a cooling power of 60), decreased ((e.g., the compressor 21 operates at a reduced cooling power of 55, 50, or a lower value) or increased (the compressor 21 operates at an increased cooling power of 65 or higher) according to the temperature of the storage compartment.

For example, when an absolute value of the difference between the set temperature and the current temperature is less than a first upper limit reference value or a first lower limit reference value, the controller 50 may maintain the cooling power of the compressor 21. For example, when the current temperature of the storage compartment is located in the temperature satisfaction range, the cooling power of the compressor 21 may be maintained.

In contrast, when the current temperature of the storage compartment is located in the temperature upper limit excess range, the cooling power of the compressor 21 may be increased. In addition, when the current temperature of the storage compartment is located in the temperature lower limit excess range, the cooling power of the compressor 21 may be decreased. For example, when the current temperature of the storage compartment is located in the temperature lower limit excess range and the absolute value of the difference between the set temperature and the current temperature of the storage compartment is greater than the first lower limit reference value and is less than the second lower limit reference value, the cooling power of the compressor 21 may be decreased by a first level.

Alternatively, when the current temperature of the storage compartment is located in the temperature lower limit excess range and the absolute value of the difference between the set temperature and the current temperature of the storage compartment is greater than the second lower limit reference value and is less than the third lower limit reference value, the cooling power of the compressor 21 may be decreased by a second level. Alternatively, when the current temperature of the storage compartment is located in the temperature lower limit excess range and the absolute value of the difference between the set temperature and the current temperature of the storage compartment is equal to and greater than the third lower limit reference value, the cooling power of the compressor 21 may be decreased by a third level.

In some situations, the second lower limit reference value may be greater than the first lower limit reference value, and the third lower limit reference value may be greater than the second lower limit reference value. For example, when the current temperature of the storage compartment is located in the temperature upper limit excess range and the absolute value of the difference between the set temperature and the current temperature of the storage compartment is greater than the first upper limit reference value and is less than the second upper limit reference value, the cooling power of the compressor 21 may be increased by a first level.

Alternatively, when the current temperature of the storage compartment is located in the temperature upper limit excess range and the absolute value of the difference between the set temperature and the current temperature of the storage compartment is greater than the second upper limit reference value and is less than the third upper limit reference value, the cooling power of the compressor 21 may be increased by a second level.

Alternatively, when the current temperature of the storage compartment is located in the temperature upper limit excess range and the absolute value of the difference between the set temperature and the current temperature of the storage compartment is equal to and greater than the third upper limit reference value, the cooling power of the compressor 21 may be increased by a third level.

In various implementations, the differences between the plurality of levels may be equal or different. For example, the first level may be set to A as a cooling power change value, the second level may be set to 2*A as a cooling power change value, and the third level may be set to 3*A as a cooling power change value. Alternatively, the first level may be set to A as a cooling power change value, the second level may be set to B (greater than A) which is not 2*A as a cooling power change value, and the third level may be set to C (greater than B) which is not 3*A as a cooling power change value.

In addition, in various implementations, the differences between the plurality of upper limit reference values or the plurality of lower limit reference values may be equal or different. For example, the first upper limit reference value may be set to 0.5, the second upper limit reference value may be set to 1, and the third upper limit reference value may be set to 1.5. Alternatively, the first upper limit reference value may be set to 0.5, the second upper limit reference value may be set to 0.9, and the third upper limit reference value may be set to 1.3.

When the cooling power of the compressor 21 is decreased (for example, the cooling power is decreased from 60 to 55), the current temperature may be sensed after the sampling time, and when the current temperature of the storage compartment is located in the temperature lower limit excess range (for example, when the absolute value of the difference between the set temperature and the current temperature of the storage compartment is greater than the first lower limit reference value and is less than the second lower limit reference value), the cooling power of the compressor 21 may be decreased again (for example, the cooling power may be decreased from 55 to 50).

Similarly, when the cooling power of the compressor 21 is increased (for example, the cooling power is decreased from 45 to 50), the current temperature may be sensed after the sampling time, and when the current temperature of the storage compartment is located in the temperature upper limit excess range (for example, when the absolute value of the difference between the set temperature and the current temperature of the storage compartment is greater than the second upper limit reference value and is less than the third upper limit reference value), the cooling power of the compressor 21 may be increased again (for example, the cooling power may be increased from 50 to 60).

As the temperature of the storage compartment is sensed at the sampling time interval and the cooling power of the compressor 21 is controlled, the temperature of the storage compartment converges to the set temperature unless changed due to external influences.

FIGS. 7 to 10 are flowcharts for illustrating a method for adjusting a cooling power of a compressor according to another embodiment that includes a different method for controlling the cooling power of the compressor. Therefore, hereinafter, differences associated with the method in FIGS. 7-10 will be described.

Referring to FIGS. 7 to 10, when the cooling cycle is started, the compressor 21 is operated at a predetermined cooling power (S11). The controller 50 controls the cooling power the compressor 21 based on the temperature of the storage compartment. For example, the controller 50 may control the cooling power of the compressor 21 such that the temperature of the storage compartment is maintained within a temperature satisfaction range (e.g., a desired temperature range for the storage compartment). For example, the controller 50 may control the cooling power of the compressor 21 using the change in temperature of the storage compartment as described in FIG. 5 and/or the difference between the set temperature and the current temperature of the storage compartment as described in FIG. 6.

For example, an evaluated change in the temperature of the storage compartment may correspond to a difference between the previous temperature and the current temperature of the storage compartment. A change in temperature of the storage compartment may be determined based on the temperature value of the storage compartment sensed at a predetermined time interval. Accordingly, the predetermined time interval may correspond is a sampling time for determining change in temperature.

The cooling power of the compressor 21 may be decreased, maintained or increased according to a first factor (e.g., the difference between the previous temperature and the current temperature of the storage compartment) for controlling the cooling power of the compressor 21 and a second factor (e.g., the difference between the set temperature and the current temperature of the storage compartment). For example, the controller 50 determines a first result associated with whether the output of the cooling power of the compressor 21 should be increased, maintained or decreased based on the first factor, determines a second result associated with whether the cooling power of the compressor 21 should be increased, maintained or decreased based on the second factor, and then finally determines whether the cooling power of the compressor 21 is increased, maintained or decreased by combining the first and second results.

For example, upon determining that the cooling power of the compressor 21 should be maintained based on the first factor and determining that the cooling power of the compressor 21 should be increased based on the second factor, the controller 50 may determine to increase the cooling power of the compressor 21. Similarly, upon determining that the cooling power of the compressor 21 should be maintained based on the first factor and determining that the cooling power of the compressor 21 should be decreased based on the second factor, the controller 50 may determine to decrease the cooling power of the compressor 21. Alternatively, when determining that the cooling power of the compressor 21 should be maintained based on both the analysis of the first factor and the analysis of the second factor, the controller 50 may maintain the cooling power of the compressor 21.

In another example, upon determining that the cooling power of the compressor 21 should be increased based on the first factor and determining that the cooling power of the compressor 21 should be maintained based on the second factor, the controller may determine to increase the cooling power of the compressor 21. Furthermore, upon determining that the cooling power of the compressor 21 should be decreased based on the first factor and determining that the cooling power of the compressor 21 should be maintained based on the second factor, the controller 50 may determine to decrease the cooling power of the compressor 21. Similarly, upon determining that the cooling power of the compressor 21 should be increased based on the first factor and the second factor, controller 50 may increase the cooling power of the compressor 21.

Upon determining that the cooling power of the compressor 21 should be decreased based on both the first factor and the second factor, the controller may determine to decrease the cooling power of the compressor 21. Furthermore, upon determining that the cooling power of the compressor 21 should be decreased based on the first factor and determining that the output of the fan should be increased based on the second factor, the cooling power of the compressor 21 may maintained, increased or decreased according to the level of the decreased cooling power determined based on the first factor and the level of the increased cooling power determined based on the second factor.

When the evaluation of the first factor suggests that the cooling power of the compressor 21 should be decreased and the evaluation of the second factor indicates that the cooling power of the compressor 21 should be increased, the controller 50 may maintain, increase or decrease the cooling power of the compressor 21 according to the level of the decreased cooling power determined based on the first factor and the level of the increased cooling power determined based on the second factor (e.g., sum the decrease associated with the first factor and the increase associated with the second factor).

Similarly, when the first factor indicates that the cooling power of the compressor 21 should be increased and the second factor indicates that the cooling power of the compressor 21 should decreased, the controller may determine whether the cooling power of the compressor 21 should be actually maintained, increased or decreased according to the level of the increased cooling power determined based on the first factor and the level of the decreased cooling power determined based on the second factor.

In addition, after the cooling power of the compressor 21 is determined, the determined cooling power may be maintained during the sampling time and, when the sampling time has elapsed, the cooling power of the compressor 21 may be determined again. For example, the cooling power of the compressor 21 may be updated at the sampling time interval. In addition, the controller 50 may manage the compressor 21 such that the compressor 21 operates with the determined cooling power during the sampling time.

When the cooling cycle is started, the temperature of the storage compartment may be sensed. When the sampling time has elapsed while the compressor 21 is operating at the predetermined cooling power, the current temperature of the storage compartment may be sensed. Next, the controller 50 determines whether a difference between the previous temperature and the current temperature of the storage compartment sensed by the temperature sensors 41 and 42 is greater than 0 (S51). A difference between the previous temperature and the current temperature of the storage compartment that is greater than 0 indicates that the temperature of the storage compartment is falling.

Upon determining that the difference between the previous temperature and the current temperature of the storage compartment is greater than 0 (S51—Yes), the controller 50 determines whether the difference between the previous temperature and the current temperature of the storage compartment is less than a first reference value (S52). Upon determining that the difference between the previous temperature and the current temperature of the storage compartment is less than the first reference value (S52—Yes), the controller 50 main determine that the cooling power of the compressor 21 should be maintained based on evaluating the first factor.

Next, the controller 50 determines whether the difference between the set temperature and the current temperature of the storage compartment is less than 0 (S53). When the difference between the set temperature and the current temperature of the storage compartment is less than 0 (S53—Yes), the current temperature is greater than the set temperature and, when the difference between the set temperature and the current temperature of the storage compartment is equal to or greater than 0 (S53—No), the current temperature is equal to or less than the set temperature.

Upon determining that the difference between the set temperature and the current temperature of the storage compartment is less than 0 (S53—Yes), the controller 50 may determine whether the current temperature is in a temperature satisfaction range (S54). When the difference between the set temperature and the current temperature of the storage compartment is smaller than a unit temperature, the current temperature of the storage compartment is relatively close to the set temperature. Upon determining that the current temperature is in the temperature satisfaction range (S54—Yes), the controller 50 may determines that the cooling power of the compressor 21 should be maintained according the evaluation of the second factor.

Accordingly, the controller 50 may maintain the current cooling power of the compressor 21 according to the result (S51 and S52) of the determination based on the first factor and the result (S53 and S54) of the determination based on the second factor (S55).

In contrast, upon determining that the current temperature of the storage compartment is out of the temperature satisfaction range (S54—No), such as the current temperature being above an upper temperature limit, the controller 50 may determines that the evaluation of the second factor suggests that the cooling power of the compressor 21 should be increased. Accordingly, the controller 50 may increase the current cooling power of the compressor 21 according to the result (S51 and S52) of the determination based on the first factor indicating to maintain the cooling power and the result (S53 and S54) of determination based on the second factor (S56) to increase the cooling power.

When the current temperature is in the temperature upper limit excess range, the absolute value of the difference between the set temperature and the current temperature of the storage compartment may be compared with the plurality of upper limit reference values to determine the increase in cooling power of the compressor 21. For example, as described in with respect to FIG. 6, when the absolute value of the difference between the set temperature and the current temperature of the storage compartment is greater than a first upper limit reference value and is less than a second upper limit reference value while the current temperature of the storage compartment is in the temperature upper limit excess range, the cooling power of the compressor 21 may be increased by the first level. Alternatively, when the absolute value of the difference between the set temperature and the current temperature of the storage compartment is greater than the second upper limit reference value and is less than a third upper limit reference value while the current temperature of the storage compartment is in the temperature upper limit excess range, the cooling power of the compressor 21 may be increased by the second level (e.g., greater than the first level). Furthermore, when the absolute value of the difference between the set temperature and the current temperature of the storage compartment is greater than the third upper limit reference value while the current temperature of the storage compartment is in the temperature upper limit excess range, the cooling power of the compressor 21 may be increased by a third level (e.g., greater than the second level).

In contrast, upon determining that the difference between the set temperature and the current temperature of the storage compartment is equal to or greater than 0 (S53—No), the controller 50 may determine whether the current temperature is in the temperature satisfaction range (S61). Upon determining that the current temperature is in the temperature satisfaction range (S61—Yes), the controller 50 may determines to maintain the cooling power of the compressor 21 as the result of determination based on the second factor. Accordingly, the controller 50 may maintain the current cooling power of the compressor 21 to the result (S51 and S52) of determination based on the first factor and the result (S53 and S61) of determination based on the second factor (S62).

In contrast, upon determining that the current temperature of the storage compartment is out of the temperature satisfaction range (S61=No), such as when the current temperature is in the temperature lower limit excess range, the controller 50 may determine that the cooling power of the compressor 21 should be decreased as the result of determination based on the second factor. Accordingly, the controller 50 may decrease the current cooling power of the compressor 21 according to the result (S51 and S52) of determination based on the first factor and the result (S53 and S61) of determination based on the second factor (S63).

When the current temperature of the storage compartment is in the temperature lower limit excess range, the absolute value of the difference between the set temperature and the current temperature of the storage compartment may be compared with the plurality of lower limit reference values to determine the decrease in cooling power of the compressor 21. For example, as described with respect to FIG. 6, when the absolute value of the difference between the set temperature and the current temperature of the storage compartment is greater than a first lower limit reference value and is less than a second lower limit reference value while the current temperature of the storage compartment is in the temperature lower limit excess range, the cooling power of the compressor 21 may be decreased by the first level.

When the absolute value of the difference between the set temperature and the current temperature of the storage compartment is greater than the second lower limit reference value and is less than a third lower limit reference value while the current temperature of the storage compartment is in the temperature lower limit excess range, the cooling power of the compressor 21 may be decreased by the second level (more than the first level). Alternatively, when the absolute value of the difference between the set temperature and the current temperature of the storage compartment is greater than the third lower limit reference value while the current temperature is in the temperature lower limit excess range, the cooling power of the compressor 21 may be decreased by the third level (more than the second level).

In contrast, when the difference between the previous temperature and the current temperature of the storage compartment is equal to or greater than a first reference value (S52—No), the controller 50 may determine that the cooling power of the compressor 21 should be decreased as the result of determination based on the first factor. Next, the controller 50 may determine whether the difference between the set temperature and the current temperature of the storage compartment is greater than 0 (S71). When the difference between the set temperature and the current temperature of the storage compartment is greater than 0 (S71—Yes), the controller 50 may determine that the cooling power of the compressor 21 should maintained or decreased according to the difference between the set temperature and the current temperature of the storage compartment (e.g., depending on whether the current temperature of the storage compartment is in the temperature satisfaction range).

When the current temperature of the storage compartment is in the temperature satisfaction range, the controller 50 may determine that the cooling power of the compressor 21 should be maintained. When the current temperature of the storage compartment is out of the temperature satisfaction range, such as when the current temperature of the storage compartment is in the temperature lower limit excess range, the decrease level of the cooling power of the compressor 21 may be determined according to the absolute value of the difference between the set temperature and the current temperature of the storage compartment. The controller 50 decreases the current cooling power of the compressor 21 to the result (S51 and S52) of determination based on the first factor and the result (S71) of based on the second factor (S72).

In contrast, upon determining that the difference between the set temperature and the current temperature of the storage compartment is equal to or less than 0 (step S71—No), the controller 50 may determine whether the current temperature of the storage compartment is in the temperature satisfaction range (S73). Upon determining that the current temperature of the storage compartment is in the temperature satisfaction range in step S73, the controller 50 determines that the output of the fan is maintained as the result of determination based on the second factor. Accordingly, the controller 50 decreases the current cooling power of the compressor 21 according to the result (S51 and S52) of the determination based on the first factor and the result (S71 and S73) of the determination based on the second factor (S74).

Upon determining that the current temperature of the storage compartment is out of the temperature satisfaction range (when the current temperature of the storage compartment is in the temperature upper limit excess range, the controller 50 determines that the cooling power of the compressor 21 should be increased as the result of determination based on the second factor. In this case, the controller 50 may maintain, increase or decrease the cooling power of the compressor 21 according to the result (S51 and S52) of determination based on the first factor and the result (S71 and S73) of determination based on the second factor. For example, the cooling power of the compressor 21 may be maintained, increased or decreased according to determined decrease in the level of the cooling power of the compressor 21 based on the first factor and the determined increase in the level of the cooling power of the compressor 21 based on the second factor.

For example, when the cooling power of the compressor 21 decreased as the result of determination based on the first factor and the cooling power of the compressor 21 increased based on the second factor are substantially equal, the controller 50 may maintain the cooling power of the compressor 21 is maintained. When a decrease in the cooling power of the compressor 21 determined based on the first factor is greater than an increase in the cooling power of the compressor 21 determined based on the second factor, the controller 50 may determine that the cooling power of the compressor 21 is decreased. When a decrease in the cooling power of the compressor 21 determined based on the first factor is less than an increase in the cooling power of the compressor 21 determined based on the second factor, the controller 50 may determine to increase that the cooling power of the compressor 21.

Upon determining that the difference between the previous temperature and the current temperature of the storage compartment is equal to or less than 0 (step S51—NO), the controller 50 may determine whether the difference between the previous temperature and the current temperature of the storage compartment is less than a first reference value (S81). Here, when the difference between the previous temperature and the current temperature of the storage compartment is equal to or less than 0, the temperature of the storage compartment is maintained or is increased during the sampling time.

Upon determining that the difference between the previous temperature and the current temperature of the storage compartment is less than the first reference value (step S81—Yes), the controller 50 determines that the cooling power of the compressor 21 is maintained as the result of determination based on the first factor. The controller 50 determines whether the difference between the set temperature and the current temperature of the storage compartment is greater than 0 (S82). Upon determining that the difference between the set temperature and the current temperature of the storage compartment is greater than 0 in step S82, the controller 50 determines whether the current temperature is in the temperature satisfaction range (S83). Upon determining that the current temperature of the storage compartment is in the temperature satisfaction range in step S83, the controller 50 determines that the cooling power of the compressor 21 should be maintained as the result of determination based on the second factor. Accordingly, the controller 50 determines to maintain the current cooling power of the compressor 21 according to the result (S51 and S81) based on the first factor and the result (S82 and S83) based on the second factor (S84).

In contrast, upon determining that the current temperature of the storage compartment is out of the temperature satisfaction range in step S83 (e.g., when the current temperature of the storage compartment is in the temperature lower limit excess range), the controller 50 may determine that the cooling power of the compressor 21 should be decreased as the result of determination based on the second factor. Accordingly, the controller 50 may decrease the cooling power of the compressor 21 according to the result (S51 and S81) based on the first factor and the result (S82 and S83) based on the second factor (S85).

Upon determining that the difference between the set temperature and the current temperature of the storage compartment is equal to or less than 0 in step S82, the controller 50 may determines whether the current temperature of the storage compartment is in the temperature satisfaction range (S86). Upon determining that the current temperature of the storage compartment is in the temperature satisfaction range in step S86, the controller 50 may determine that the output of the fan should be maintained as a result of evaluating the second factor. Accordingly, the controller 50 may maintain the cooling power of the compressor 21 according to the result (S51 and S81) based on the first factor and the result (S82 and S83) based on the second factor (S85).

In contrast, upon determining that the current temperature of the storage compartment is out of the temperature satisfaction range (e.g., when the current temperature of the storage compartment is in the temperature upper limit excess range), the controller 50 may determine an increase in the cooling power of the compressor 21 according to a comparison between the absolute value of the difference between the set temperature and the current temperature of the storage compartment as the result of determination based on the second factor and the plurality of reference values. Thus, the controller 50 may increase that the cooling power of the compressor 21 according to the result (S51 and S81) based on the first factor and the result (S82 and S83) based on the second factor (S88).

When the difference between the previous temperature and the current temperature of the storage compartment is equal to or greater than the first reference value in step S81, the controller 50 may determine that the cooling power of the compressor 21 should be increased as the result of determination based on the first factor. The controller 50 may determine when the difference between the set temperature and the current temperature of the storage compartment is greater than 0 (S91). When the difference between the set temperature and the current temperature of the storage compartment is greater than 0 in step S91, the controller 50 may determine that the current temperature of the storage compartment is in the temperature satisfaction range (S92). Upon determining that the current temperature of the storage compartment is in the temperature satisfaction range in step S92, the controller 50 may determine that the cooling power of the compressor 21 should be maintained as the result based on the second factor. Accordingly, the controller 50 may increase the current cooling power of the compressor 21 according to the result (S51 and S81) based on the first factor and the result (S91 and S92) based on the second factor (S93).

In contrast, when the current temperature of the storage compartment is out of the temperature satisfaction range (e.g., when the current temperature is in the temperature lower limit excess range), the controller 50 may determine that the cooling power of the compressor 21 should be decreased as the result of the determination based on the second factor. In this case, the controller 50 may maintain, increase or decrease the cooling power of the compressor 21 based on the result (S51 and S81) based on the first factor and the result (S91 and S92) based on the second factor (S94).

For example, whether the cooling power of the compressor 21 should be maintained, increased or decreased may be determined according to the level of the cooling power of the compressor 21 increased based on the result based on the first factor and the level of the cooling power of the compressor 21 decreased based on the result based on the second factor. When an increase in the cooling power of the compressor 21 based on the first factor and a decrease in the cooling power of the compressor 21 based on the result based on the second factor are substantially equal, the controller 50 may determine that the cooling power of the compressor 21 should be maintained.

When the cooling power of the compressor 21 should be increased based on the first factor by a value that is greater in a decrease in the cooling power of the compressor 21 based on the result based on the second factor, the controller 50 may determine that the cooling power of the compressor 21 should be increased. Similarly, when the cooling power of the compressor 21 increased as the result based on the first factor is less than the cooling power of the compressor 21 decreased based on the result based on the second factor, the controller 50 may determine that the cooling power of the compressor 21 should be decreased.

Upon determining that the difference between the set temperature and the current temperature of the storage compartment is equal to or less than 0 in step S91, the controller 50 may determine that the cooling power of the compressor 21 should be maintained or increased as the result based on the second factor according to the level of the absolute value of the difference between the set temperature and the current temperature of the storage compartment. When the absolute value of the difference between the set temperature and the current temperature of the storage compartment is less than a first reference value, that the cooling power of the compressor 21 is maintained.

When the absolute value of the difference between the set temperature and the current temperature of the storage compartment is equal to or greater than the first reference value, the increase level of the cooling power of the compressor 21 may be determined according to the comparison between the absolute value of the difference between the set temperature and the current temperature of the storage compartment and the plurality of reference values. In either case, the controller 50 determines that the current cooling power of the compressor 21 is increased according to the result (S51 and S52) of determination based on the first factor and the result (S71) of based on the second factor (S95).

FIG. 11 is a graph illustrating change in temperature of a storage compartment and output control of a fan according to the third embodiment. Numbers on the graph of FIG. 11 correspond to examples of the cooling power of the compressor. Referring to FIG. 11, the temperature of the storage compartment may be sensed at a sampling time interval, and the controller 50 may manage the cooling power of the compressor 21 based on the first factor and the second factor. For example, while the compressor 21 operates with cooling power of 60, the cooling power may be maintained (e.g., cooling power stays at 60), decreased (e.g., cooling power is reduced from 60, such as to 55, 45, 40 or 35) or increased (e.g., cooling power is increased from 60, such as to 70 or 65) according to the temperature of the storage compartment.

When the door of the refrigerator is opened to increase the temperature of the storage compartment or when food is further introduced into the storage compartment, the storage compartment may be become warmer. When the temperature of the storage compartment is equal to or greater than the reference temperature A1, the controller 50 may perform control such that the compressor 21 operates with the predetermined first cooling power value, for example, the maximum cooling power value, in order to rapidly decrease the temperature of the storage compartment. For example, the controller 50 may sense whether the door of the refrigerator is opened, and perform control such that sensing that the door is opened, the compressor 21 operates the compressor 21 at a predetermined first cooling power value (for example, the maximum cooling power value) during the sampling time until the temperature of the storage compartment reaches a specific temperature in the temperature satisfaction range or until the temperature of the storage compartment reaches the OFF reference temperature A2, when the temperature of the storage compartment is equal to or greater than the reference temperature A1.

Next, the controller 50 may perform control such that the compressor 21 operates with a second cooling power value lower than the first cooling power value when the temperature of the storage compartment reaches the set temperature. As the temperature of the storage compartment is sensed at the sampling time interval and the cooling power of the compressor 21 is controlled, the temperature of the storage compartment converges to the set temperature as long as there are no external influences. In order to maintain the temperature of the storage compartment close to the set temperature, the cooling power of the compressor 21 may be maintained at a specific cooling power through the cooling power control process.

Accordingly, since the temperature of the storage compartment can be constantly maintained, the storage period of food can be increased. For example, the food stored in the storage compartment can be prevented from being overcooled or wilted. In addition, in order to constantly maintain the temperature of the storage compartment, since the compressor is not stopped and is maintained in a driving state (continuous operation), power consumed for initial startup of the compressor may be reduced.

In addition, since the cooling power of the compressor may be controlled based on a difference between a previous temperature and a current temperature and/or a difference between a set temperature and a current temperature, it is possible to rapidly return to a constant temperature when the temperature of the storage compartment deviates from the constant temperature.

Aspects of the present disclosure provide a refrigerator and a method for controlling the same for maintaining a temperature of a storage compartment in a constant temperature state to improve freshness of an object to be stored. A refrigerator and a method for controlling the same may have a power consumption that is reduced while the temperature of the storage compartment is maintained in the constant temperature state. A refrigerator and a method for controlling the same may have a temperature of the storage compartment that may be rapidly recovered when the temperature of the storage compartment is out of the constant temperature state.

In a first aspect of the present disclosure, a method for controlling a refrigerator including a compressor for compressing a refrigerant, a first evaporator for receiving the refrigerant from the compressor and generating cool air for cooling a first storage compartment, first fan for supplying cool air to the first storage compartment, a second evaporator for receiving the refrigerant from the compressor and generating cool air for cooling a second storage compartment, second fan for supplying cool air to the second storage compartment, and a valve for selectively opening one of a first refrigerant passage connected between the compressor and the first evaporator to allow the refrigerant to flow between the compressor and the first evaporator and a second refrigerant passage connected between the compressor and the second evaporator to allow the refrigerant to flow between the compressor and the second evaporator, wherein the refrigerator is configured to alternately cool the first storage compartment and the second storage compartment.

The method may include operating a first cooling cycle for cooling the first storage compartment to operate the compressor and operating the first fan for the first storage compartment, and switching the first cooling cycle to a second cooling cycle for cooling the second storage compartment to operate the compressor and operating the second fan when a stop condition of the first cooling cycle is satisfied.

A temperature of each storage compartment may be sensed at sampling time intervals in each cooling cycle. Further, a controller may determine a cooling power of the compressor for each sampling time based on a sensed current temperature of the storage compartment, and operate the compressor at the determined cooling power.

A refrigerator may include a compressor for compressing a refrigerant, a first evaporator for receiving the refrigerant from the compressor and generating cool air for cooling a first storage compartment, first fan for supplying cool air to the first storage compartment, a second evaporator for receiving the refrigerant from the compressor and generating cool air for cooling a second storage compartment, second fan for supplying cool air to the second storage compartment, a valve for selectively opening one of a first refrigerant passage connected between the compressor and the first evaporator to allow the refrigerant to flow between the compressor and the first evaporator and a second refrigerant passage connected between the compressor and the second evaporator to allow the refrigerant to flow between the compressor and the second evaporator, first and second temperature sensors for detecting temperatures of the storage compartments, respectively, and a controller for controlling a cooling power of the compressor based on the temperatures of the storage compartments sensed by the temperature sensors, respectively.

In one implementation, the controller may operate the compressor and the first fan for cooling the first storage compartment, and operate the second fan and maintain the ON state of the compressor for cooling the second storage compartment when the cooling of the first storage compartment is completed. In one implementation, the temperature of each storage compartment may be sensed at sampling time intervals in the cooling of each storage compartment. In one implementation, the controller may determine the cooling power of the compressor for each sampling time based on a sensed current temperature of each storage compartment, and operate the compressor at the determined cooling power.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method to control a refrigerator that includes a compressor that compresses refrigerant, a first evaporator that receives compressed refrigerant from the compressor and generates cool air, a first fan that moves the cool air from the first evaporator to a first storage compartment, a second evaporator that receives refrigerant from the compressor and generates cool air, a second fan that moves the cool air from the second evaporator to a second storage compartment, and a valve that causes refrigerant to flow selectively between the compressor and the first evaporator or between the compressor and the second evaporator such that the first storage compartment and the second storage compartment are cooled alternatively, the method comprising:
    operating a first cooling cycle to cool the first storage compartment, wherein operating the first cooling cycle includes activating the compressor and first fan;
    ceasing the first cooling cycle and operating a second cooling cycle to cool the second storage compartment when a stop condition of the first cooling cycle is satisfied, wherein operating the second cooling cycle includes activating the compressor and the second fan; and
    sensing temperatures of the first and second storage compartments at sampling times when operating the first cooling cycle or operating the second cooling cycle,
    wherein operating the first cooling cycle or the second cooling cycle includes:
        determining a cooling level of the compressor based on the sensed temperature of one of the first storage compartment or the second storage compartment during a current time period; and
        operating the compressor at the determined cooling level, and
    wherein the method further comprises:
        changing the cooling level of the compressor when an absolute value of a difference between a previous temperature of the first storage compartment and a current temperature of the first storage compartment is equal to or greater than a first reference value during the first cooling cycle; and
        changing the cooling level of the compressor when an absolute value of a difference between a previous temperature of the second storage compartment and a current temperature of the second storage compartment is equal to or greater than a second reference value during the second cooling cycle.

2. The method of claim 1, further comprising:
    determining whether a stop condition of the second cooling cycle is satisfied when operating the second cooling cycle;
    performing a pump down operation when the stop condition of the second cooling cycle is satisfied, the pump down operation including the compressor being operated while the valve is closed such that refrigerant is not provided to the first evaporator and the second evaporator for a period of time; and
    operating the first cooling cycle after the pump down operation.

3. The method of claim 1, wherein the stop condition of the first cooling cycle and a stop condition of the second cooling cycle are satisfied when:
    the cooling level of the compressor is maintained within a prescribed cooling level range during a time period,
    variations in temperatures of the storage compartment and the second storage are maintained within a prescribed temperature range during the time period,
    current temperatures of the first storage compartment and the second storage compartment reach respective set temperatures,
    a prescribed time elapses after the current temperatures of the first and second storage compartments reaches the set temperatures, or
    a set time elapses after the first cooling cycle and the second cooling cycle start operating.

4. The method of claim 1, further comprising:
    changing the cooling level of the compressor again when an absolute value of a difference between a current temperature of the first storage compartment after the sampling times and a previous temperature of first storage compartments is equal to or greater than the first reference value during the first cooling cycle, and
    changing the cooling level of the compressor again when an absolute value of a difference between a current temperature of the second storage compartment after the sampling times and a previous temperature of the second storage compartments is equal to or greater than the second reference value during the second cooling cycle.

5. The method of claim 4, further comprising:
determining to decrease the cooling level of the compressor when the difference between the previous temperature of the first storage compartment and the current temperature of the first storage compartment is greater than zero and the absolute value of the difference between the previous temperature and the current temperature of the first storage compartment is equal to or greater than the first reference value, or
determining to decrease the cooling level of the compressor when the difference between the previous temperature of the second storage compartment and the current temperature of the second storage compartment is greater than zero and the absolute value of the difference between the previous temperature and the current temperature of the second storage compartment is equal to or greater than the second reference value.

6. The method of claim 4, further comprising:
determining to increase the cooling level of the compressor when the difference between the previous temperature of the first storage compartment and the current temperature of the first storage compartment is less than zero and the absolute value of the difference between the previous temperature and the current temperature of the first storage compartment is equal to or greater than the first reference value; and
determining to increase the cooling level of the compressor when the difference between the previous temperature of the second storage compartment and the current temperature of the second storage compartment is less than zero and the absolute value of the difference between the previous temperature and the current temperature of the second storage compartment is equal to or greater than the second reference value.

7. The method of claim 4, further comprising:
determining to decrease or increase the cooling level of the compressor by a first level when the absolute value of the difference between the previous temperature the first storage compartment and the current temperature of the first storage compartment is equal to or greater than the first reference value and less than a third reference value that is greater than the first reference value; and
determining to decrease or increase the cooling level of the compressor by a second level greater than the first level when the absolute value of the difference between the previous temperature and the current temperature of the first storage compartment is equal to or greater than the third reference value.

8. The method of claim 4, further comprising:
determining to maintain the cooling level of the compressor when the absolute value of the difference between the previous temperature of the first storage compartment and the current temperature of the first storage compartment is less than the first reference value, or
determining to maintain the cooling level of the compressor when the absolute value of the difference between the previous temperature of the second storage compartment and the current temperature of the second storage compartment is less than the second reference value.

9. The method of claim 4, further comprising:
determining to decrease or increase the cooling level of the compressor by a first level when the absolute value of the difference between the previous temperature the second storage compartment and the current temperature of the second storage compartment is equal to or greater than the second reference value and less than a fourth reference value that is greater than the second reference value; and
determining to decrease or increase the cooling level of the compressor by a second level greater than the first level when the absolute value of the difference between the previous temperature and the current temperature of the second storage compartment is equal to or greater than the fourth reference value.

10. A method to control a refrigerator that includes a compressor that compresses refrigerant, a first evaporator that receives compressed refrigerant from the compressor and generating cool air, first fan that moves the cool air from the first evaporator to a first storage compartment, a second evaporator to receive refrigerant from the compressor and generate cool air, a second fan that moves the cool air from the second evaporator to a second storage compartment, and a valve that allows refrigerant to flow selectively between the compressor and the first evaporator or between the compressor and the second evaporator such that the first storage compartment and the second storage compartment are cooled alternatively, the method comprising:
operating a first cooling cycle to cool the first storage compartment, wherein operating the first cooling cycle includes activating the compressor and first fan;
ceasing the first cooling cycle and operating a second cooling cycle to cool the second storage compartment when a stop condition of the first cooling cycle is satisfied, wherein operating the second cooling cycle includes activating the compressor and the second fan; and
sensing temperatures of the first and second storage compartments at sampling times when operating the first cooling cycle or operating the second cooling cycle,
wherein operating the first cooling cycle or the second cooling cycle includes:
determining a cooling level of the compressor based on the sensed temperature of one of the first storage compartment or the second storage compartment during a current time period; and
operating the compressor at the determined cooling level, and
wherein the method further comprises:
determining a first decrease or increase of the cooling level of the compressor when an absolute value of a difference between a set temperature of the first storage compartment and a current temperature of the first storage compartment is equal to or greater than a first reference value during the first cooling cycle; and
determining to maintain the cooling level of the compressor when the absolute value of the difference between the set temperature and the current temperature of the first storage compartment is less than the first reference value during the first cooling cycle.

11. The method of claim 10, wherein the first reference value includes a first upper limit reference, and
wherein the method further comprises:
determining to increase the cooling level of the compressor when the current temperature of the first storage compartment is higher than the set temperature and when the absolute value of the difference between the set temperature and the current temperature of the first storage compartment is greater than the first upper limit reference value.

12. The method of claim 10, wherein the first reference value includes a first lower limit reference value, and wherein the method further comprises:
determining to decrease the cooling level of the compressor when the current temperature of the first storage compartment is lower than the set temperature and when the absolute value of the difference between the set temperature and the current temperature of the first storage compartment is greater than the first lower limit reference value.

13. The method of claim 10, further comprising determining a first decrease or increase of the cooling level of the compressor when an absolute value of a difference between a set temperature of the second storage compartment and a current temperature of the second storage compartment is equal to or greater than a second reference value during the second cooling cycle; and
determining to maintain the cooling level of the compressor when the absolute value of the difference between the set temperature and the current temperature of the second storage compartment is less than the second reference value during the second cooling cycle.

14. The method of claim 10, further comprising determining a second decrease or increase of the cooling level of the compressor when an absolute value of a difference between the set temperature and a current temperature of the first storage compartment sensed after the sampling times is equal to or greater than the first reference value during the first cooling cycle, or
determining a second decrease or increase of the cooling level of the compressor when an absolute value of a difference between the set temperature and a current temperature of the second storage compartment sensed after the sampling times is equal to or greater than the second reference value during the second cooling cycle.

15. The method of claim 10, wherein when an absolute value of a difference between a set temperature of the first storage compartment and a current temperature of the first storage compartment is less than the first reference value during the first cooling cycle, a first sampling time is applicable as a sampling time for sensing a current temperature of a next time, and
when an absolute value of a difference between a set temperature of the first storage compartment and a current temperature of the first storage compartment is equal to or greater than the first reference value during the first cooling cycle, a second sampling time greater or less than the first sampling time is applicable as a sampling time.

16. The method of claim 10, wherein the second reference value includes a first upper limit reference, and wherein the method further comprises:
determining to increase the cooling level of the compressor when the current temperature of the second storage compartment is higher than the set temperature and when the absolute value of the difference between the set temperature and the current temperature of the second storage compartment is greater than the first upper limit reference value.

17. The method of claim 10, wherein the first reference value includes a first lower limit reference value, and wherein the method further comprises:
determining to decrease the cooling level of the compressor when the current temperature of the second storage compartment is lower than the set temperature and when the absolute value of the difference between the set temperature and the current temperature of the second storage compartment is greater than the first lower limit reference value.

18. A method to control a refrigerator that includes a compressor that compresses refrigerant, a first evaporator that receives compressed refrigerant from the compressor and generating cool air, first fan that moves the cool air from the first evaporator to a first storage compartment, a second evaporator to receive refrigerant from the compressor and generate cool air, a second fan that moves the cool air from the second evaporator to a second storage compartment, and a valve that allows refrigerant to flow selectively between the compressor and the first evaporator or between the compressor and the second evaporator such that the first storage compartment and the second storage compartment are cooled alternatively, the method comprising:
operating a first cooling cycle to cool the first storage compartment, wherein operating the first cooling cycle includes activating the compressor and first fan;
ceasing the first cooling cycle and operating a second cooling cycle to cool the second storage compartment when a stop condition of the first cooling cycle is satisfied, wherein operating the second cooling cycle includes activating the compressor and the second fan; and
sensing temperatures of the first and second storage compartments at sampling times when operating the first cooling cycle or operating the second cooling cycle,
wherein operating the first cooling cycle or the second cooling cycle includes:
determining a cooling level of the compressor based on the sensed temperature of one of the first storage compartment or the second storage compartment during a current time period; and
operating the compressor at the determined cooling level, and
wherein the method further comprises:
adjusting the cooling level of the compressor based on a difference between a set temperature of the first storage compartment and a current temperature of the first storage compartment and based on a change in the temperature of the first storage compartment at the sampling times during the first cooling cycle, or
adjusting the cooling level of the compressor based on a difference between a set temperature of the second storage compartment and a current temperature of the second storage compartment and based on a change in the temperature of the second storage compartment at the sampling times during the second cooling cycle.

19. The method of claim 18, further comprising:
determining a first change in the cooling level of the compressor based on a first factor corresponding to the change in the temperature of the one of the first or second storage compartments;
determining a second change in the cooling level of the compressor based on a second factor that corresponds to the difference between the set temperature and the current temperature of the one of the first or second storage compartments; and
determining whether to increase, maintain, or decrease the cooling level of the compressor based on by combining the first change associated with the first factor and the second change associated with the second factor.

\* \* \* \* \*